US010127319B2

(12) United States Patent
Chakra et al.

(10) Patent No.: US 10,127,319 B2
(45) Date of Patent: *Nov. 13, 2018

(54) DISTRIBUTED FAILOVER FOR UNAVAILABLE CONTENT

(71) Applicant: International Business Machines Corporation, Armonk, NY (US)

(72) Inventors: Al Chakra, Apex, NC (US); Anuradha D. Chitta, Bangalore (IN); Liam Harpur, Dublin (IE); Soumitra G. Limaye, Pune (IN); Ranjit S. Rai, Pune (IN)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/836,098

(22) Filed: Aug. 26, 2015

(65) Prior Publication Data

US 2016/0196314 A1    Jul. 7, 2016

Related U.S. Application Data

(63) Continuation of application No. 14/590,207, filed on Jan. 6, 2015.

(51) Int. Cl.
*G06F 17/30* (2006.01)
*H04L 29/08* (2006.01)

(52) U.S. Cl.
CPC .. *G06F 17/30864* (2013.01); *G06F 17/30011* (2013.01); *G06F 17/30887* (2013.01); *H04L 67/327* (2013.01)

(58) Field of Classification Search
CPC ......... G06F 17/30011; G06F 17/30864; G06F 17/30887; H04L 67/327
See application file for complete search history.

(56) References Cited

U.S. PATENT DOCUMENTS

| | | | |
|---|---|---|---|
| 7,958,199 B2 | 6/2011 | Ferrari et al. | |
| 8,346,769 B2 | 1/2013 | Wilhelm | |
| 2002/0016786 A1* | 2/2002 | Pitkow | G06F 17/30884 |
| 2008/0209339 A1* | 8/2008 | Macadaan | G06F 3/0482 |
| | | | 715/745 |
| 2014/0085323 A1* | 3/2014 | Wang | G06K 9/00442 |
| | | | 345/581 |

(Continued)

OTHER PUBLICATIONS

List of IBM Patents or Patent Applications Treated as Related, Aug. 26, 2015.

*Primary Examiner* — Taelor Kim
(74) *Attorney, Agent, or Firm* — Robert Shatto; Edell, Shapiro & Finnan, LLC

(57) ABSTRACT

According to one embodiment of the present invention, a system for processing a request for a document that is unavailable on a network identifies one or more alternative documents on the network with content similar to a previously accessed document and relating to a group. The system presents the identified one or more alternative documents as a result of a request for the previously accessed document when the previously accessed document is unavailable on the network. Embodiments of the present invention further include a method and computer program product for providing alternative documents in substantially the same manners described above.

7 Claims, 2 Drawing Sheets

(56) References Cited

U.S. PATENT DOCUMENTS

2014/0108901 A1     4/2014    Carriero et al.
2014/0172839 A1*   6/2014    Christoph ......... G06F 17/30887
                                                           707/723

* cited by examiner

US 10,127,319 B2

DISTRIBUTED FAILOVER FOR UNAVAILABLE CONTENT

CROSS-REFERENCE TO RELATED APPLCATIONS

This application is a continuation of U.S. patent application Ser. No. 14/590,207, entitled "DISTRIBUTED FAILOVER FOR UNAVAILABLE CONTENT" and filed Jan. 6, 2015 the disclosure of which is incorporated herein by reference in its entirety.

BACKGROUND

Present invention embodiments relate to content discovery, and more specifically, to providing alternative content when referenced content is no longer available.

When content pointed to by a hyperlink or bookmark is removed or otherwise becomes unavailable, a person attempting to access that content typically receives an error message indicating that the requested page or uniform resource locator (URL) is no longer available. Locating an alternative source for the same or similar content may be a time consuming process.

SUMMARY

According to one embodiment of the present invention, a system for processing a request for a document that is unavailable on a network identifies one or more alternative documents on the network with content similar to a previously accessed document and relating to a group. The system presents the identified one or more alternative documents as a result of a request for the previously accessed document when the previously accessed document is unavailable on the network. Embodiments of the present invention farther include a method and computer program product for providing alternative documents in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments process requests for documents and provide alternative content when requested content is unavailable on a network. According to one embodiment of the present invention, members of a group associated with a subject matter (e.g., an engineering group, financial group, etc.) use a network system (e.g., a collaboration framework, workgroup service, social media, social network, etc.) to assemble information of interest to the group members. This information may include references (e.g., hyperlinks, bookmarks, etc.) to content (e.g., web pages, blog entries, documents, images, etc.) provided by sources internal or external to the group. The system comprises a proxy server for the referenced information. Modules of the proxy server may interact with group members' requests for items of the content, responses to the requests, network sources, information about the group, and the references to the content to provide alternative content when the requested item is unavailable. In an example scenario, a user finds item 1 at a first web page in January. The system remembers that content. In May, item 1 is deleted from the first web page, in November, the user accesses the first web page looking for item 1. In response, the system may automatically offer the user a link to item 1 on another web page, without anyone having to manually create the link to the other page.

One aspect of a present invention embodiment is to improve the operation of a network system (e.g., a collaboration framework, workgroup service, social media, social network, etc.) for facilitating distribution of management, collection, and dissemination of information among members of a group by automatically providing one or more alternatives to unavailable content within a network. For example, one user of a social media group may track web pages related to topic X for the group, while another user tracks pages related to topic Y for the group. Accordingly, a member of a group need not have to perform a search for replacement content by repeating the original search process from the beginning when content becomes unavailable. This may save time and increase productivity.

Figure 1:
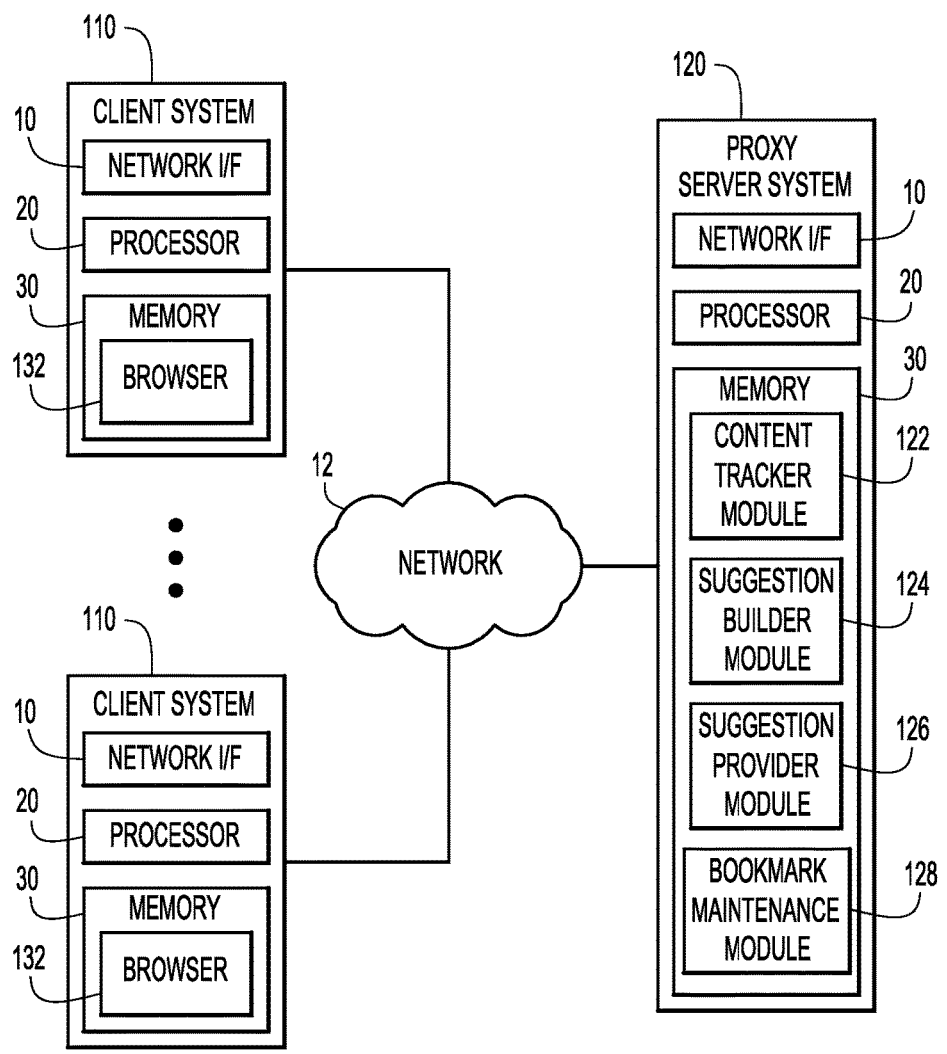
FIG. 1 is a diagrammatic illustration of an example environment for an embodiment of the present invention.

An example environment for present invention embodiments is illustrated in FIG. 1. Specifically, the environment includes one or more client or end-user systems 110 and proxy server system 120. Client systems 110 and proxy server system 120 may be remote from each other and communicate over a network 12. Network 12 may be implemented by any number of any suitable communications media. (e.g., wide area network (WAN), local area network (LAN), Internet, intranet, etc.). Alternatively, any number of client systems 110 and proxy server systems 120 may be local to each other, and communicate via any appropriate local communication medium (e.g., local area network (LAN), hardwire, wireless link, intranet, etc.).

A proxy server system 120 may include content tracker module 122, suggestion builder module 124, suggestion provider module 126, and bookmark maintenance module 128. The content tracker module, suggestion builder module, suggestion provider module, and bookmark maintenance module may be implemented across plural server systems. Alternatively, any combination of the modules may reside on a client system 110 or other computer system in communication with a client system.

Client systems 110 enable users to communicate with the proxy server system via network 12). The client systems may present any graphical user (e.g., all, etc.) or other interface (e.g., web browser 132, command line prompts, menu screens, etc.) to receive requests from users and interact with the proxy server system and/or other modules or services.

Proxy server systems 120 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.)), optional input devices (e.g., a keyboard, mouse, or other input device), and any commercially available and custom software (e.g., proxy software, collaboration software, social network software, web server software, content management software, database software, etc.)).

The proxy server system and/or client system may include one or more modules or units (e.g., content tracker module, suggestion builder module, suggestion provider module, and bookmark maintenance module, etc.) to perform the various functions of present invention embodiments described below (e.g., determining whether previously accessed content is still available, searching for content similar to previously accessed content, updating references to content, etc.). These modules may be implemented by any combination of any quantity of software and/or hardware modules or units, and may reside within memory 30 of a proxy server system and/or client systems for execution by processor 20.

Proxy server system 120 may operate on behalf of a group collaboration service, social media, social network service, or the like. For example, a user may log in (e.g., from client device 110) to a network service as a member of a particular group and access external content via the proxy server. The proxy server may store a reference to the content, metadata for the content, and/or the content itself. For example, the user may create and save a bookmark or link to the content on a web page (referred to as the group page) for information that may be of interest to the group. The proxy server saves the bookmarked content and/or metadata (e.g., keywords, title, timestamp, etc.) for the content.

Figure 2:
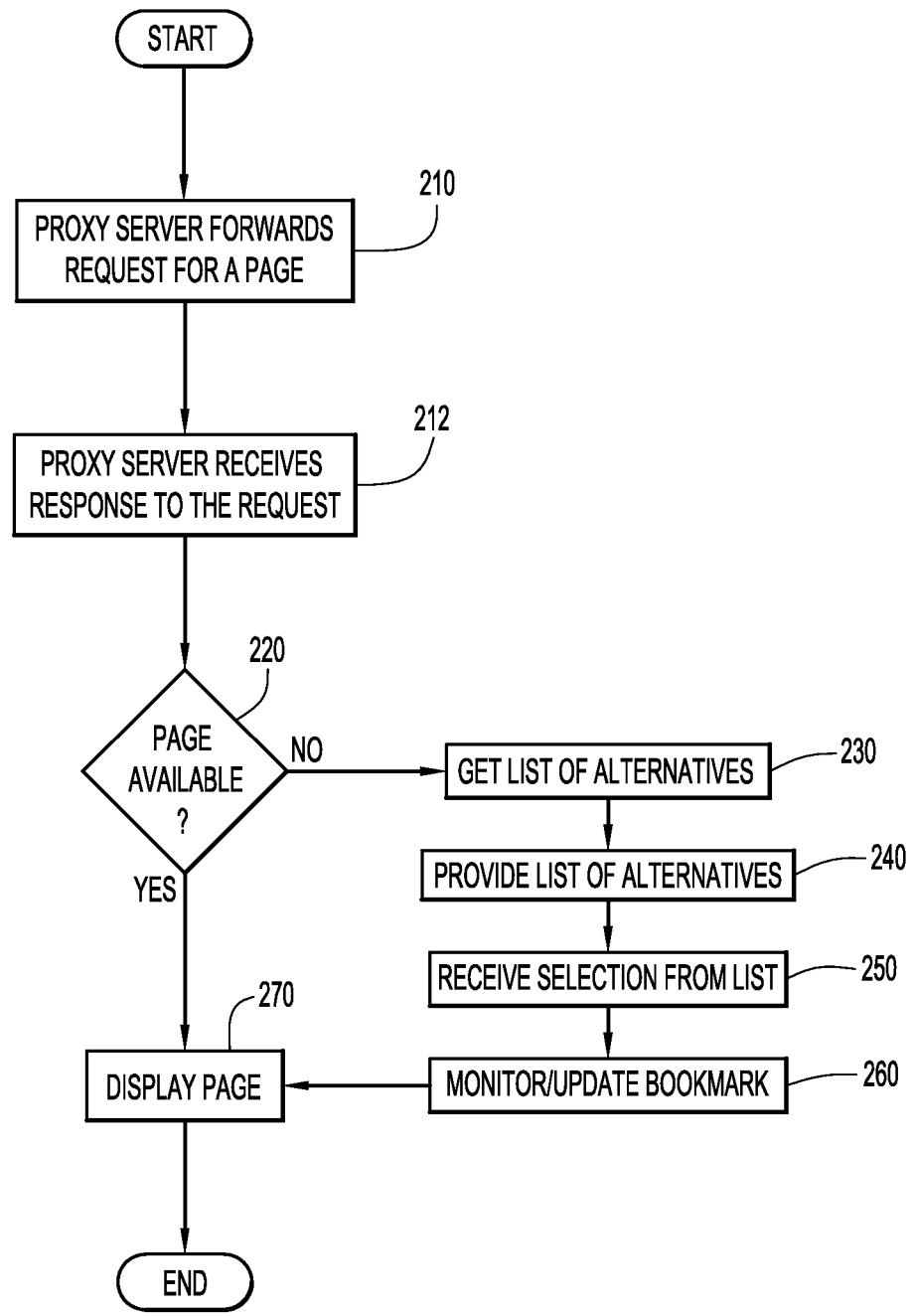
FIG. 2 is a flow diagram illustrating an example manner of processing a request for content on a network according to an embodiment of the present invention.

An example manner of processing a request for content on a network (e.g., via processor 20 of proxy server system 120) according to an embodiment of the present invention is illustrated in FIG. 2. Initially, proxy server system 120 receives the request for content (e.g., from client device 110 via network 12) and forwards the request at step 210 to a source from which the content has been accessed previously. For example, a user may log into a network service as a member of a group, view a group page, and select a link on the page to access the linked-to content. The proxy server sends a request for the content to the content's source at step 210, and receives a response to the request at step 212.

At step 220, content tracker module 122 determines whether the received response indicates that the requested content is available. For example, the response may be an HTTP 404 error or other message indicating that the source no longer provides the requested content, or the response may indicate that the source itself (e.g., a web server) is no longer available.

Alternatively, the response to the request may comprise content that differs substantially from the content that was previously accessed and linked to. For example, a user may have bookmarked a web page discussing a topic that changes from time to time, or a domain name may have been transferred to another owner and applied to a different subject. The content tracker module may compare the received content to a copy of the previously accessed content using conventional or other text or language processing tools. For example, if the number of different words between the received content and the stored content exceeds a predetermined value (e.g., 0, 1, 5, 10, etc.) the content tracker module may determine that the original content is no longer available.

If the content tracker module determines at step 220 that the content is no longer available, it notifies suggestion builder module 124, and processing proceeds to step 230. Otherwise, the proxy server provides the returned content to the user at step 270.

At step 230, suggestion builder module 124 determines a list of one or more alternative suggestions for the unavailable content. To generate a list of alternatives for a link, the suggestion builder module may, for example, generate a query comprising keywords characteristic of the original content. The keywords may be extracted from metadata associated with the linked content (e.g., HTML meta elements), the title of the content, and/or the body of the content (e.g., using conventional or other natural language processing techniques). The suggestion builder module may submit the generated query to a conventional or other search engine and extract links to alternative content from the query results. Alternatively, the suggestion builder module may search for similar content based on text comparisons, analytics, images comparisons, etc. in addition, the suggestion builder module may refine the search based on characteristics of interest to the particular group. For example, keywords characteristic of a group's interests may be included in the query (e.g., engineering terms for an engineering group, finance terms for a finance group, etc.). Accordingly, when the system finds alternative content, such content is relevant and in context with the theme of the group.

The suggestion builder module may generate the list of alternatives dynamically in response to notification from the tracker module that the content referred to by a particular is no longer available. Alternatively, the suggestion builder may generate a list of alternatives in response to creation of a link on a group page. The suggestions builder may asynchronously generate a list of alternatives for each link on a group page lacking a list of alternatives or having a list of alternatives older than a predetermined amount. The suggestion builder module may store these pre-generated suggestion lists. In any case, the suggestion builder module sends the generated list of alternatives to suggestion provider module 126 in response to notification from the content tracker module that the link points to content that is no longer available.

At step 240, suggestion provider module 126 receives the list of alternatives from the suggestion builder module and presents the list of alternatives to the user. For example, the suggestion provider module may generate and send to the client system a HyperText Markup Language (HTML) page that indicates the requested content is no longer available, lists the suggested alternatives, and prompts the user to select an alternative from the list.

At step 250, bookmark maintenance module 128 receives the user's selection from the list. In response to the selection, the bookmark maintenance module may automatically replace the broken link with the user's selection at step 260. Alternatively, the bookmark maintenance module may replace the link in response to achieving a predetermined degree of confidence in a particular alternative. For example, the bookmark maintenance module may monitor a number (e.g., 2, 5, 10, etc.) of user selections and replace the link with the most frequently selected alternative.

The proxy server provides at step 270 the content for the alternative selection received at step 250.

It will be appreciated that the embodiments described above and illustrated in the drawings represent only a few of the many ways of implementing embodiments for providing alternative content when referenced content is no longer available.

For example, content tracker module 122 may from time to time poll sources of content linked to from a group page to determine whether the content remains available at that source.

The environment of the present invention embodiments may include any number of computer or other processing systems (e.g., client or end-user systems, proxy server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and proxy server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of processing a request for a document that is unavailable on a network comprising:
   processing a request for a previously accessed document from a corresponding link by:
     sending the request to a location on the network of a source storing the previously accessed document;
     receiving a response from the source including one of: an error message, and content accessed by the source based on the request;
     analyzing the response and determining that the previously accessed document is unavailable on the network when one of: the response includes the error message, and the response includes the accessed content and a number of different words between the accessed content and stored content of the previously accessed document from a prior access exceeds a predetermined value; and in response to the previously accessed document being unavailable on the network, generating a query and identifying a plurality of alternative documents on the network with content pertaining to content of the previously accessed document and relating to a network group of users, wherein the network group of users is associated with a subject matter, and wherein the query includes first keywords from metadata associated with the previously accessed document and second keywords pertaining to one or more interests of the network group of users in the subject matter;

presenting the identified alternative documents as a result of the request for the previously accessed document when the analyzing indicates that the previously accessed document is unavailable on the network; and replacing the corresponding link, when the previously accessed document is unavailable on the network, with a link to a presented alternative document based on a degree of confidence in the presented alternative document determined from a quantity of user selections for the presented alternative document, wherein the presented alternative document is a most frequently selected alternative document of the identified alternative documents.

2. The computer-implemented method of claim 1, wherein identifying the plurality of alternative documents includes:

extracting document information from the previously accessed document in response to one of a prior access of that document and entering that document on a list indicating prior accessed documents.

3. The computer-implemented method of claim 1, wherein the previously accessed document resides on a list indicating prior accessed documents and invoking requests for those prior accessed documents.

4. The computer-implemented method of claim 3, further comprising:

removing the previously accessed document from the list when the analyzing indicates that the previously accessed document is unavailable on the network.

5. The computer-implemented method of claim 3, further comprising:

replacing the previously accessed document on the list with at least one identified alternative document when the analyzing indicates that the previously accessed document is unavailable on the network.

6. The computer-implemented method of claim 1, further comprising:

tracking documents accessed by a user and documents entered by the user on a list indicating documents previously accessed by the user.

7. The computer-implemented method of claim 6, wherein the user is a member of the network group with documents tracked for each member being associated with a different topic.

\* \* \* \* \*